United States Patent [19]

Young

[11] Patent Number: 4,987,635
[45] Date of Patent: Jan. 29, 1991

[54] CAN TROWEL

[76] Inventor: Bobby D. Young, R.D. #1, Box 299-B, Shelocta, Pa. 15774

[21] Appl. No.: 9,491

[22] Filed: Feb. 2, 1987

[51] Int. Cl.[5] .................. A47L 25/00; B01F 13/00
[52] U.S. Cl. ............................. 15/236.01; 366/129
[58] Field of Search ............ 15/235.4, 235.3, 236 R, 15/245, 105.5, 111, 112, 113, 235.5, 235.6, 235.7, 235.8, 237, 236.01; D4/118; D32/40, 46, 47, 48, 49; 366/129

[56] References Cited

U.S. PATENT DOCUMENTS

| 1,498,509 | 6/1924 | Arnold | 366/129 X |
| 1,883,726 | 10/1932 | Warren | |
| 2,524,475 | 10/1950 | Renz | 15/236 R |
| 2,777,676 | 1/1957 | Carter | 366/129 |
| 3,363,316 | 1/1968 | Skarsten | 15/236 R |
| 3,377,642 | 4/1968 | Reak | 15/236 R |
| 4,627,128 | 12/1986 | Shea | 15/236 R |

FOREIGN PATENT DOCUMENTS 2572762  5/1986  France .................. 15/105.5

Primary Examiner—Harvey C. Hornsby
Assistant Examiner—Scott J. Haugland
Attorney, Agent, or Firm—Leon Gilden

[57] ABSTRACT

A trowel is provided with a curved edge conformingly shaped to fit the interior dimensions of a can so as to permit a complete removal of the material contained within the can. Additionally, a top edge of the trowel is angled to permit the removal of material retained beneath the interior rim of the container.

1 Claim, 2 Drawing Sheets

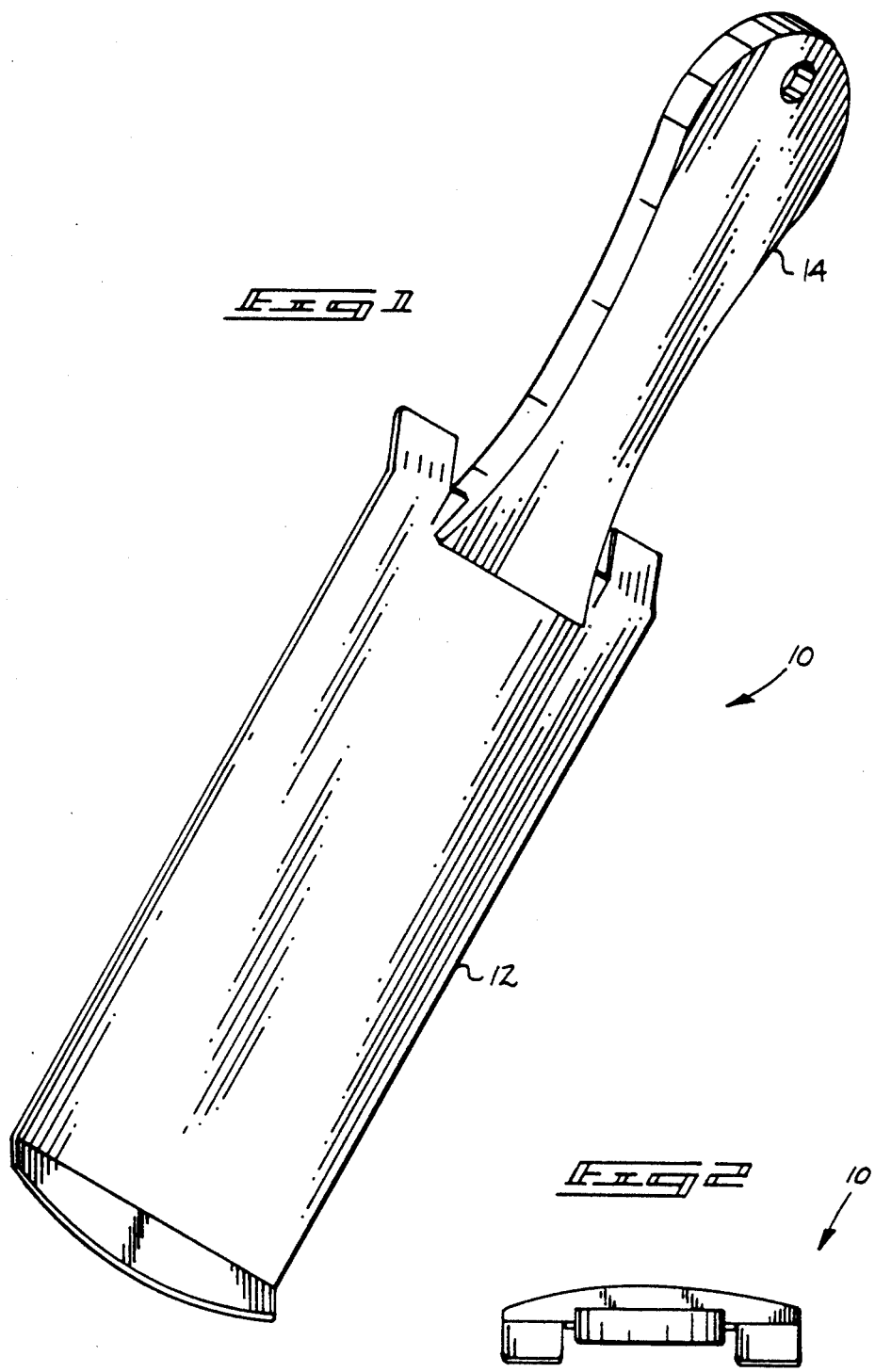

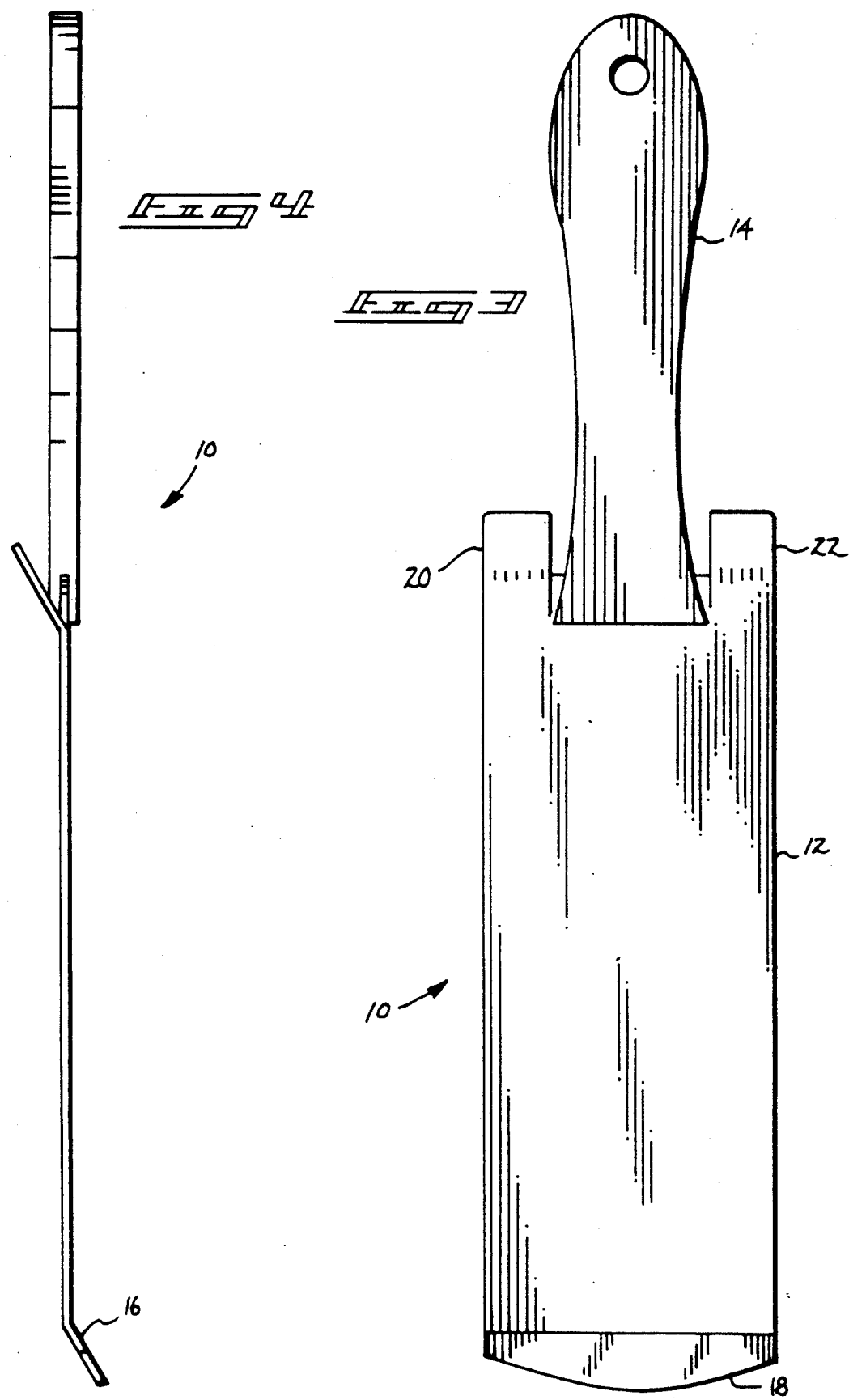

CAN TROWEL

BACKGROUND OF THE INVENTION

1. Field of the Invention

The present invention relates to trowels, and more particularly pertains to a new and improved trowel which is conformingly shaped to the interior dimensions of a material holding container.

2. Description of the Prior Art

The use of trowels to remove various materials, such as adhesives, putties, glues, roof coatings, and the like, from containers is well known in the prior art. Typical examples of prior art trowels which are used for such material removing purposes are to be found in U.S. Pat. No. 1,021,945, which issued to W. Newton on Apr. 2, 1912, and U.S. Pat. No. DES. 145,524, which issued to O. Hoffman on Sept. 3, 1946. Inasmuch as most material holding containers are of a cylindrical construction, it will be noted from reviewing the construction of the prior art trowels that they are not particularly well designed for removing all of the material contained within a container. More specifically, the trowels are not conformingly shaped to the interior curvilinearly-shaped surfaces of cylindrical containers, and accordingly, there exists a continuing need for types of trowels which could effect a more complete removal of material contained within such containers. In this respect, the present invention substantially fulfills this need.

SUMMARY OF THE INVENTION

In view of the foregoing disadvantages inherent in the known types of trowels now present in the prior art, the present invention provides an improved trowel construction wherein the same is provided with angulated and curvilinearly shaped edges which are designed to conformingly move along an interior curvilinearly shaped surface of a material holding container, thereby to effect a complete removal of material contained within the container. As such, the general purpose of the present invention, which will be described subsequently in greater detail, is to provide a new and improved trowel which has all the advantages of the prior art trowels and none of the disadvantages.

To attain this, the present invention comprises a trowel having a lower curved edge which is conformingly shaped to the interior curved surface of a material holding container. This lower edge can then be utilized to scrape all of the material out of the container so as to prevent wastage. Additionally, a top edge of the trowel is angulated in a manner which permits its insertion beneath an interior rim portion of the container, thereby to remove any additional material which may be captured beneath the rim.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trowel which has all the advantages of the prior art trowels and none of the disadvantages.

It is another object of the present invention to provide a new and improved trowel which may be easily and efficiently manufactured and marketed.

It is a further object of the present invention to provide a new and improved trowel which is of a durable and reliable construction.

An even further object of the present invention is to provide a new and improved trowel which is susceptible of a low cost of manufacture with regard to both materials and labor, and which accordingly is then susceptible of low prices of sale to the consuming public, thereby making such trowels economically available to the buying public.

Still yet another object of the present invention is to provide a new and improved trowel which provides in the apparatuses and methods of the prior art some of the advantages thereof, while simultaneously overcoming some of the disadvantages normally associated therewith.

Still another object of the present invention is to provide a new and improved trowel which includes edges conformingly shaped to an interior portion of a material holding container.

Yet another object of the present invention is to provide a new and improved trowel which is designed to effect a complete removal of material contained within a material holding container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the trowel comprising the present invention.

FIG. 2 is an end elevation view of the trowel.

FIG. 3 is a side elevation view of the trowel.

FIG. 4 is a top plan view of the invention.

DESCRIPTION OF THE PREFERRED EMBODIMENT

With reference now to the drawings, and in particular to FIGS. 1, 2, 3 and 4 thereof, a new and improved trowel embodying the principles and concepts of the present invention and generally designated by the reference numeral 10 will be described.

More specifically, it will be noted that the trowel 10 essentially includes an elongated blade member 12 having a handle 14 attached thereto. A bottom edge of the blade 12 includes an angled portion 16 with this angled portion having a curved edge 18 which is substantially conformingly shaped to the interior surface of a cylindrically-shaped material holding container.

Additionally, a top edge portion of the blade 12 which lies proximate the handle 14 includes first and second angulated integral portions 20, 22. These angulated portions 20, 22 extend rearwardly of the handle 14 and are designed for insertion beneath an interior rim portion of a cylindrically shaped material holding container. The entire blade assembly 12 is of an integral construction and may be formed of any rigid material, such as metal or like, which would permit the use of the invention in its purported manner.

As to the manner of usage and operation of the present invention 10, the same should be apparent from the above description. However, a brief summary of the manner of usage and operation will be provided. More particularly, it can be appreciated that once an unillustrated cylindrically shaped container of material has been opened, the trowel 10 may be inserted therein to effect a removal of material therefrom. Once the material holding container has been substantially emptied, the curvilinearly shaped edge 18 may be used to remove final small amounts of material from the container. Similarly, the angulated edge portions 20, 22 may be inserted beneath an interior rim of the container to remove any additional material retained beneath the rim. As such, a complete removal of all material within the container can be effected by the design of the present invention. Additionally, it should be noted that the trowel 10 can be utilized to spread or otherwise apply any material removed from a material holding container, while the trowel could also be utilized for various other useful purposes, such as a paint scraper or the like.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the U.S. is as follows:

1. A new and improved trowel for removing material from a material holding container comprising a blade means including a substantially planar central portion formed with a forward and rearward edge and a first and second surface; a forward curvilinear portion integrally formed to said forward edge of said central portion and extending at an acute angle relative to said first surface including a substantially planar body portion and a continuous curvilinear free edge portion, and a handle means secured centrally to said rearward edge extending longitudinally of said central portion, and a plurality of planar edge portions integrally secured to said second edge on either side of said handle means and extending at an acute angle relative to said second surface of said central portion enabling access to material within said container utilizing said continuous curvilinear free edge portion and said plurality of planar edge portions.

* * * * *